United States Patent [19]

Baum

[11] 4,290,508

[45] Sep. 22, 1981

[54] DISC BRAKE PAD ASSEMBLIES

[75] Inventor: Heinz W. Baum, Saarbrucken Dudweiler, Fed. Rep. of Germany

[73] Assignee: Lucas Industries Limited, Birmingham, England

[21] Appl. No.: 71,497

[22] Filed: Aug. 31, 1979

[30] Foreign Application Priority Data

Sep. 14, 1978 [GB] United Kingdom ............... 36802/78
Nov. 27, 1978 [GB] United Kingdom ............... 46110/78

[51] Int. Cl.³ ............................................. F16D 65/00
[52] U.S. Cl. ................................................. 188/73.38
[58] Field of Search .................. 188/73.5, 73.1, 205 A

[56] References Cited

U.S. PATENT DOCUMENTS

| | | | |
|---|---|---|---|
| 3,357,523 | 12/1967 | Reed et al. | 188/73.5 |
| 3,915,263 | 10/1975 | Courbot | 188/73.5 X |
| 3,958,667 | 5/1976 | de Gennes | 188/73.1 X |
| 4,056,174 | 11/1977 | Wienand et al. | 188/73.5 |

FOREIGN PATENT DOCUMENTS

| | | | |
|---|---|---|---|
| 2204047 | 8/1973 | Fed. Rep. of Germany | 188/73.5 |
| 2334232 | 1/1975 | Fed. Rep. of Germany | 188/73.3 |
| 2545748 | 5/1976 | Fed. Rep. of Germany | 188/73.5 |
| 2557302 | 6/1977 | Fed. Rep. of Germany | 188/73.4 |
| 2745947 | 4/1978 | Fed. Rep. of Germany | 188/73.5 |
| 2751673 | 5/1978 | Fed. Rep. of Germany | 188/73.5 |

Primary Examiner—Georgge E. A. Halvosa
Attorney, Agent, or Firm—Scrivener, Clarke, Scrivener and Johnson

[57] ABSTRACT

A friction pad assembly comprises a backing plate having friction material secured thereto, and an anti-rattle spring having a bent portion intermediate its ends, the bent portion seating in a recess in the backing plate. To avoid problems caused by heat when the spring is held in place in the recess by the friction material and located before heat bonding of the friction material, the recess is accessible to secure the spring to the backing plate after the friction material is secured to the backing plate. The bent portion is preferably retained in position in the recess by its own resilience.

9 Claims, 14 Drawing Figures

DISC BRAKE PAD ASSEMBLIES

This invention relates to friction pad assemblies for use in sliding caliper disc brakes.

Commonly, friction pads are supported on guides of the disc brake, the braking drag forces being transmitted from the pad to the vehicle frame via the guides. Clearance is usually provided between the guides and the pad to permit the pad to slide towards and away from the disc during brake application and release. To prevent rattling of the pad on the guides it has previously been proposed to attach to the pad an anti-rattle spring to bias the pad against the guide.

A pad assembly incorporating an anti-rattle spring is illustrated and described in U.S. Pat. No. 4,056,174. The spring shown in that Specification has a coil portion and two arms extending outwardly from the coil portion. The spring is attached to an upwardly extending projection on the pad backing plate by a pin passing through the coil portion of the spring.

That pad assembly has proved expensive to produce because a considerable amount of backing plate material has to be scrapped during production, which is by stamping process, because the provision of the projection necessitates a large blank of material than would otherwise be required. The quality, and thus the cost, of the backing plate material is necessarily high.

In an attempt to reduce the amount of scrap material, it has been proposed to locate the anti-rattle spring in a groove in the backing plate, the pad holding the spring in position. This has the disadvantage that the spring has to be located in the groove before the friction material is moulded on to the back plate. The heat required in the moulding process can damage the spring and alter its characteristics. Furthermore, it has been discovered that when the pad cools the spring remains "fixed" and cannot adjust its position to allow the pad assembly to align properly in the brake. Such failure to align creates uneven side loads on the pad causing it to tilt within the pad guides.

The aim of the present invention is to overcome, or at least reduce, the above-mentioned disadvantages of previously proposed pad assemblies.

One aspect of the invention provides a friction pad assembly comprising a backing plate having friction material secured thereto, and an anti-rattle spring having a bent portion intermediate its ends said portion seating in a recess in the backing plate, wherein said recess is accessible to secure the spring to the backing plate after the friction material is secured to the backing plate.

Another aspect of the invention provides a friction pad assembly comprising a backing plate having friction material secured thereto, and an anti-rattle spring having a bent portion intermediate its ends, said portion seating in a recess in the backing plate, wherein the spring is retained in the recess by the inherent resilience of the bent portion.

In one embodiment of the invention described in more detail below the recess is so arranged that the coil of the spring is in a plane substantially perpendicular to the backing plate. The spring seats in two recesses provided by undercuts formed one on each side of a projection on the backing plate, the undercuts being close to the base of the projection. Thus, the projection need be only slightly deeper than the undercuts.

In another embodiment of the invention, the bent portion of the spring is in a plane substantially parallel with the backing plate, the recess being formed by a hole passing through the backing plate and opening through the top of the plate, the top opening having a width less than the diameter of the hole. The bent portion of the spring is circular and seats in the hole, one side of which is cloed by the pad. In the latter embodiment, the backing plate requires no projection.

Several embodiments of the invention in the form of disc brake pad assemblies will now be described, by way of example, with reference to the accompanying drawings, in which.

Figures 5, 6:
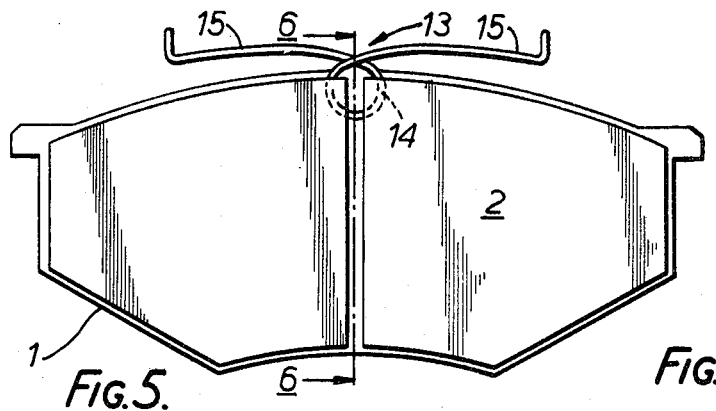
FIG. 5 is a side elevation of another form of assembly.
FIG. 6 is a cross sectional view taken on lines 6—6 of FIG. 5.
Figures 7, 8:
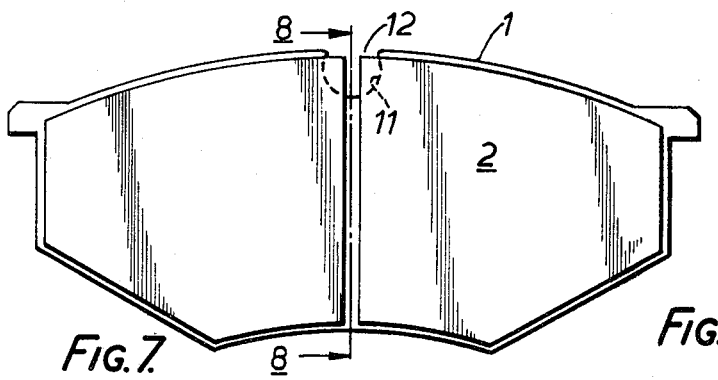
Figure 9:
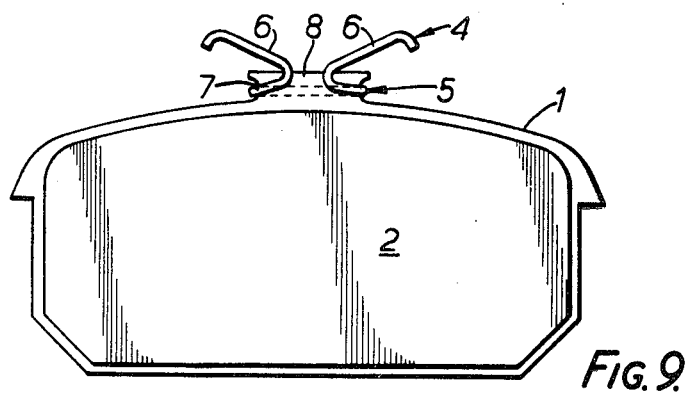
Figure 10:
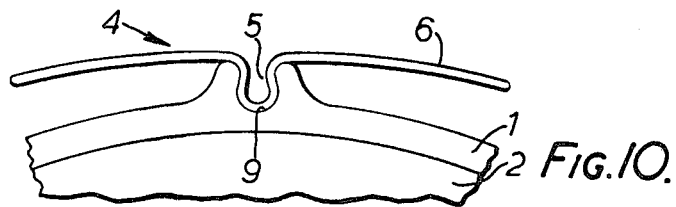
Figure 11:
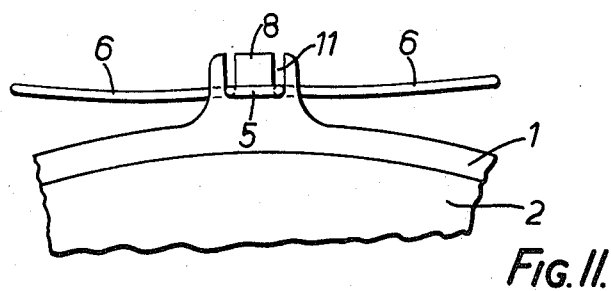
Figure 12:
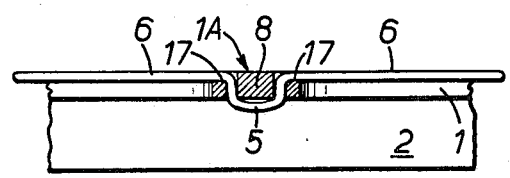
Figure 13:
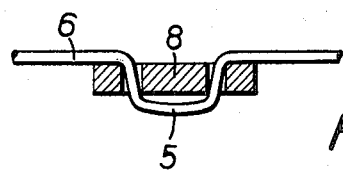
Figure 14:
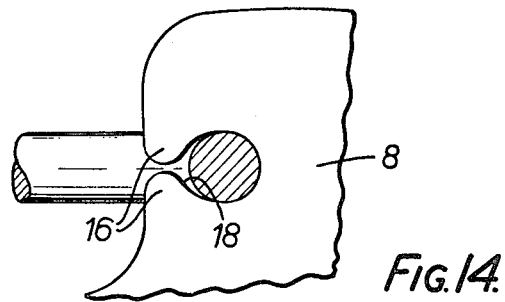

FIGS. 7 and 8 are views similar to those of FIGS. 5 and 6, respectively, before attachment of an anti-rattle spring, FIG. 9 is a side elevation of another form of assembly, FIG. 10 is a detail side view of yet another form of assembly, FIG. 11 is a view similar to that of FIG. 10 of yet another form of assembly, FIG. 12 is a detail transverse sectional view of the assembly of FIG. 11, FIG. 13 is a sectional view similar to that of FIG. 12 of a further form of assembly, and FIG. 14 is a detail view showing means for retaining a spring of an assembly.

Each of the forms of pad assembly comprises the backing plate 1 and a pad 2. The backing plate 1 has laterally extending shoulders 3 which are free of friction pad material and which, when mounted in a sliding caliper disc brake, are supported on guides. A suitable disc brake for mounting the pad assemblies described herein is described and illustrated in U.S. Pat. No. 4,056,174 to which attention is directed for a better understanding of the description herein.

The pad assembly of FIGS. 1 to 4 comprises an anti-rattle spring 4 having a bent portion 5 of rectangular shape and two outwardly and upwardly extending arms 6. When mounted in a brake, the arms 6 serve to bias the shoulders 3 against their guides to prevent or reduce rattle of the assembly. Side parts 5A of the bent portion seat in recesses provided by undercuts 7 formed at the base of an upwardly extending projection 8 on the backing plate 1. The spring 4 is preferably wrapped around the projection in such a matter that it is difficult to remove the spring from the projection.

Figure 1:
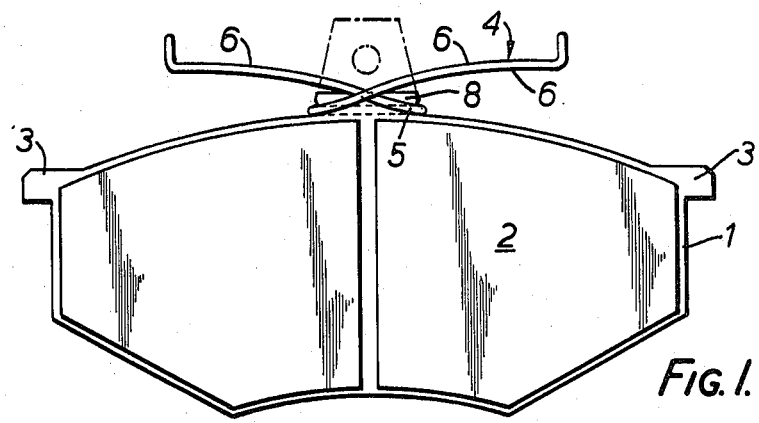
FIG. 1 is a side elevation of one form of assembly.
Figure 2:
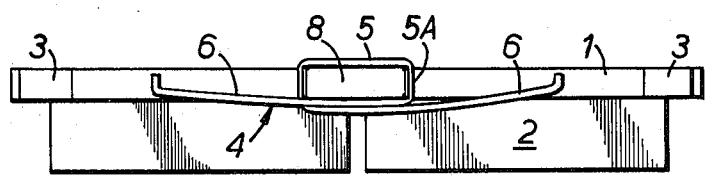
FIG. 2 is a plan view of the assembly of FIG. 1.
Figure 3:
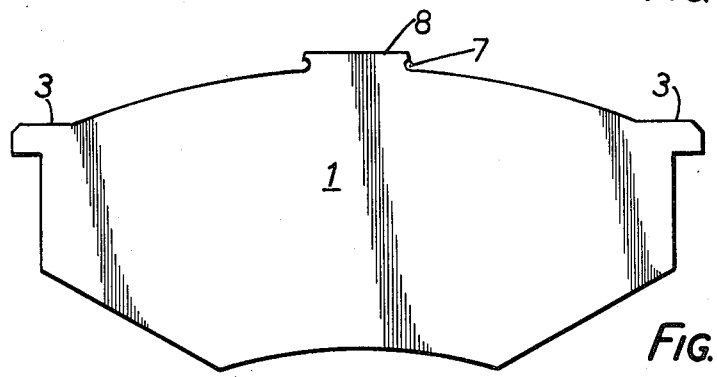
FIG. 3 is a side elevation of the backing plate of the assembly of FIG. 1.
Figure 4:
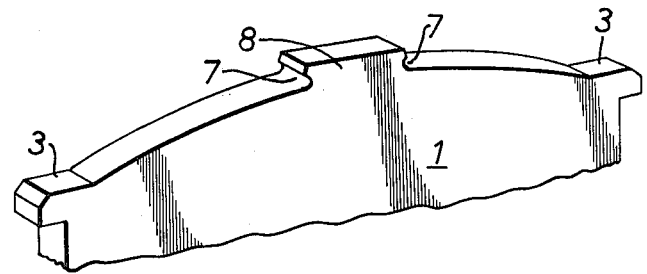
FIG. 4 is a detail perspective view of the backing plate of FIG. 3.

The projection 8 has a depth considerably smaller than that of the projection of the pad assembly described in the said patent, the comparative size of the last-mentioned projection being shown in broken lines in FIG. 1. The depth of projection 8 is the minimum required to provide the undercuts 7.

In the pad assembly of FIGS. 5 to 8, the backing plate 1 has a recess formed by a hole 11 which provides an opening 12 at the top of the plate, the opening 12 having a width less than the diameter of the hole 11. A spring 13 having a circular coil portion 14 and outwardly extending arms 15 is inserted in the recess with the plane of the coil portion 14 being parallel with the plane of the backing plate 1.

One side of the hole 11 is partially covered by the pad 2 and the edge of the other side of the hole is inturned after insertion of the spring to form a lip 16. Thus, the spring is prevented from falling out of the hole.

In each of the above described embodiments the bent portion of the spring has at least one complete turn.

The last-described embodiment has the advantages over the first described embodiment that the spring 13 acts as a true coil spring which utilizes the full spring effect of the coil portion 14, whereas in the spring 4 the resilience is provided by the arms 6, and that the projection 8 is not required.

Furthermore, the diameter of the coil portion 14 can be so chosen that it is an interference fit in the hole 11, but that when the spring is laden the diameter can alter to be smaller than the hole diameter. Thus, the spring 13 can be readily inserted by loading it to reduce the diameter of coil portion 14 and then inserting the coil portion into the hole. The change in diameter of the coil portion 14 under load ensures movement of that portion during use which prevents corrosion which provides a cleaning effect of the hole 11.

In the assemblies described below the bent portions are only partially coiled.

The embodiment of FIG. 9 is similar to that of FIG. 1 and the same numerals are used to denote similar parts. The bent portion 5 is part-rectangular in shape and seats in recesses formed by undercuts 7 at the base of the upwardly extending portion 8 of the backing plate 1. The portion 8 may extend to a greater height and be tapered to permit the spring to be pushed downwardly over the portion 8.

The bent portion 5 of the spring 4 of the assembly of FIG. 10 is part-circular and seats in a part-circular recess 9 whose upper opening width is less than the diameter of the recess. The plane of the bent portion 5 is substantially parallel with the plane of backing plate 1.

FIGS. 11 and 12 shown as assembly in which the spring bent portion is substantially part rectangular, two sides of the portion fitting in recesses 11 formed in an upstanding portion 8 of the backing plate 1. In this form of assembly cut-outs 17 are provided on one side of the portion 8 to ensure that the arms 6 of the spring do not protrude beyond the plane of the rear surface 1A of the backing plate.

The assembly of FIG. 13 is similar to that of FIGS. 11 and 12 except that the cut-outs 17 are not provided.

FIG. 14 illustrates an assembly in which the spring seats in recesses 18 in an upstanding portion 8 of the backing plate 1 and is retained therein by projections or lips 16. The recesses are preferably located close to the base of the portion 8 so that the height of the portion is as small as possible.

In each of the above described embodiments it is possible to arrange the bent portion of the spring such that the inherent resilience of the spring retains the spring in position in the recess. Furthermore, it will be appreciated that the springs may be attached to the backing plate after the pad has been secured thereto, so that the spring is not subjected to the heat required to bond the pad to the backing plate.

It will be appreciated that to accommodate the larger projection of the pad assembly described in said U.S. Pat. No. 4,056,174 a recess was provided in the caliper bridge of the disc brake and that the abovedescribed pad assemblies require a much smaller recess, or none at all. Thus, the bridge may be made more compact and/or stronger.

I claim:

1. A friction pad assembly comprising a backing plate having front and rear faces and friction material secured to said front face, an anti-rattle spring having a bent portion intermediate its ends, and a recess extending across the width of said backing plate from the front to the rear faces thereof, said recess having an opening which extends outwardly through the edge of said backing plate between the front and rear faces thereof said opening being smaller than the largest dimension of said recess, said bent intermediate portion of said spring being seated in said recess and forming a positive connection therewith by the inherent resilience of the bent portion, said recess and said bent portion forming the sole connection between said spring and said backing plate, said recess being accessible to secure the spring to the backing plate after the friction material is secured to the backing plate, said spring being removable from said recess without deformation of said backing plate.

2. A pad assembly according to claim 1, wherein the plane of the bent portion of the spring is substantially parallel with the backing plate.

3. A pad assembly according to any of claims 1 or 2, wherein the recess is formed in a projection upstanding from the backing plate.

4. A pad assembly according to claim 1, wherein the recess is formed by a hole passing through the backing plate.

5. A pad assembly according to claim 4, wherein the hole is covered on one side by the friction material.

6. A pad assembly according to claim 5, wherein the edge of the hole on the opposite side is inturned to form a lip preventing removal of the spring without resilient deformation thereof.

7. A pad assembly according to claim 1, wherein the bent portion is a coil which extends through at least one turn.

8. A pad assembly according to claim 7, wherein the spring is retained in the recess by the inherent resilience of the bent portion.

9. A pad assembly according to claim 1, wherein the bent portion is bent through less than one turn.

* * * * *